(12) United States Patent
Ray et al.

(10) Patent No.: US 7,876,807 B2
(45) Date of Patent: Jan. 25, 2011

(54) ASYMMETRY TECHNIQUE FOR MULTIPATH MITIGATION IN PSEUDORANDOM NOISE RANGING RECEIVER

(75) Inventors: Jayanta Kumar Ray, Bangalore (IN); Rakesh Nayak, Bangalore (IN)

(73) Assignee: Accord Software & Systems Pvt. Ltd., Bangalore (IN)

( * ) Notice: Subject to any disclaimer, the term of this patent is extended or adjusted under 35 U.S.C. 154(b) by 906 days.

(21) Appl. No.: 11/628,706

(22) PCT Filed: Jul. 5, 2004

(86) PCT No.: PCT/IN2004/000197

§ 371 (c)(1),
(2), (4) Date: Dec. 5, 2006

(87) PCT Pub. No.: WO2006/003674

PCT Pub. Date: Jan. 12, 2006

(65) Prior Publication Data

US 2007/0274375 A1    Nov. 29, 2007

(51) Int. Cl.
*H03K 9/00*    (2006.01)
*H04B 1/00*    (2006.01)

(52) U.S. Cl. .................. 375/136; 375/316; 375/142; 375/147; 375/150

(58) Field of Classification Search .............. 375/134, 375/136, 137, 142, 147, 148, 149, 150, 316, 375/365–367
See application file for complete search history.

(56) References Cited

U.S. PATENT DOCUMENTS

| | | | | |
|---|---|---|---|---|
| 5,963,601 A | * | 10/1999 | Pon et al. | 375/346 |
| 6,683,568 B1 | * | 1/2004 | James et al. | 342/387 |
| 7,471,717 B2 | * | 12/2008 | Huang | 375/150 |
| 2002/0034215 A1 | * | 3/2002 | Inoue et al. | 375/147 |
| 2003/0123408 A1 | * | 7/2003 | Saitou | 370/335 |
| 2004/0179585 A1 | * | 9/2004 | Yang et al. | 375/148 |
| 2004/0203871 A1 | * | 10/2004 | Geier et al. | 455/456.1 |
| 2004/0253934 A1 | * | 12/2004 | Ryu et al. | 455/101 |
| 2005/0190735 A1 | * | 9/2005 | Shinoda | 370/342 |

* cited by examiner

*Primary Examiner*—David C Payne
*Assistant Examiner*—Linda Wong
(74) *Attorney, Agent, or Firm*—Ash Tankha

(57) ABSTRACT

This invention is directed to a method for estimating and compensating for multipath errors in a pseudorandom noise ranging receiver. The method exploits the asymmetry of the correlation function and proportionately relates it to the magnitude of multipath error. In a pseudorandom noise ranging receiver, the correlation function is obtained by generating the local pseudorandom noise sequences at different programmed non-uniform phases resulting in non-uniformly spaced correlators. Numerically controlled oscillators, code generators and shift registers are programmed to determine the correlation values at non-uniformly distributed points on a correlation function. Curve fitting is undertaken to determine the code phase at which the correlation function peaks. A proportionality constant is applied to the measure of asymmetry of the correlation function to determine the multipath error in the pseudorandom noise signal. A filter is used to detect and eliminate outliers.

6 Claims, 17 Drawing Sheets

US 7,876,807 B2

ASYMMETRY TECHNIQUE FOR MULTIPATH MITIGATION IN PSEUDORANDOM NOISE RANGING RECEIVER

TECHNICAL FIELD

This invention relates, in general, to a pseudorandom noise (PRN) ranging receiver and in particular to multipath error reduction in a pseudorandom noise (PRN) ranging receiver.

BACKGROUND ART

A PRN receiver such as a global positioning system receiver (GPS receiver) receives a PRN signal from a satellite to conduct range measurement. However, the GPS receiver receives both direct signals from the satellite as well as several multipath signals as a result of undesired reflections. The signal path of a reflected signal is longer than the signal path of a direct signal from the satellite. Such a reflected signal with a longer transmission path takes additional time to reach the receiver. Reflected signals also undergo attenuation and changes in polarization. These multiple signals, with varying phase and magnitude, result in a composite signal that does not accurately represent the true characteristics of the code and carrier phase of the direct signal.

The accuracy of the range measurements conducted by a GPS receiver depends upon the accuracy of alignment of the incoming direct signal from the satellite with the locally generated PRN signal of the GPS receiver. Multipath signals affect the accuracy of the estimated range. The combination of the direct signal and the multipath signals creates a composite signal. The receiver tracking loops align the locally generated code and carrier to the composite signal instead of the direct signal. The inaccuracy that results causes multipath errors in the range measurement conducted by the GPS receiver. The multipath errors manifest itself as a shift in the peak of the correlation function computed by the GPS receiver.

The PRN range, information is used to estimate the position, velocity and time of the user in a GPS system. The range information is derived from the satellite signals in the GPS Receiver. The incoming GPS signals undergo significant processing in the receiver for recovery of the GPS signal, differentiating it from the thermal noise. Current multipath mitigation solutions comprising signal processing algorithms in conjunction with suitable hardware are discussed below.

The methods of reducing multipath effects in a PRN ranging receiver can be broadly classified under antenna focused solutions, receiver hardware solutions, and signal and data processing solutions.

The antenna-based mitigation technique improves antenna gain pattern to counter the effects of multipath. This method includes the use of special antennas, spatial processing with multi-antenna arrays, antenna location strategies and long-term signal observation to infer multipath parameters, facilitated by changing reflection geometry.

Another approach uses a correlator with a fraction of code chip spacing and a large RF bandwidth. C/A codes are equally spaced with respect to the center correlator. Further, after the acquisition of a satellite, the correlators' spacing is static. Conventionally, the correlators are equally spaced with respect to each other. This approach is an effective solution for long delay multipath mitigation. It is the basis for the majority of the current high accuracy GPS receivers. However, this approach still does not eliminate a significant part of residual multipath errors.

Another approach involves the estimation of the slope of the two sides of the auto-correlation function in order to detect the auto-correlation peak. However, even this approach does not eliminate a significant part of residual multipath errors.

Another approach utilizes multiple narrowly-spaced correlators, generally in the order of ten or more correlators to estimate the entire correlation function. The method thereafter estimates various multipath parameters and computes the amount of multipath errors. However, this technique is most effective only when the physical multipath environment in which the antenna is located matches closely with the model used by the estimator in the receiver. Further, it requires very complex hardware to accomplish multipath mitigation.

Another approach of multipath mitigation uses a discriminator, wherein the discriminator is the difference of slopes of two sets of narrow correlators spaced at d chip and 2d chip spacing. This technique shows very good long delay multipath mitigation performance. It is not particularly effective for short delay multipath signals.

Yet another approach of multipath mitigation uses a cubic curve fit discriminant to determine the correlation function peak and a multipath indicator function to estimate the multipath error. However, this approach requires calibration of each GPS unit to characterize the RF front-end response. Further, it is most effective for reflected signals that have delays between 0.15Tc and 0.85Tc, where Tc represents the C/A (coarse acquisition) code chip width.

Several other researchers have devised methods to counter multipath effects using measurement data and other information generated by the receiver. These techniques and approaches are outside the scope of this invention.

In summary, the market requires a low cost multipath mitigation solution that accurately determines multipath errors, utilizing minimal hardware and requiring minimal calibration.

DISCLOSURE OF THE INVENTION

The present invention is an improved PRN range measurement method and apparatus that utilizes the asymmetry of the correlation function resulting from multipath signals to determine the measurement range error. The present invention optionally uses an estimation or filtering technique, and an outlier detector to improve the accuracy and reliability of the estimation.

One embodiment of the invention is a PRN ranging Global Positioning System receiver apparatus, consisting of a wideband radio frequency (RF) front end, multiple parallel programmable phased correlators and a digital signal processor (DSP) for faster acquisition. The apparatus provides improved measurement accuracy and reliability by employing the asymmetry technique of multipath. This architecture is suitable for a variety of applications requiring faster acquisition and provides better accuracy at lower hardware cost.

Another embodiment of the invention employs a phased correlator for each satellite tracking channel in the multi-channel GPS receiver. The GPS receiver consists of multiple numerically controlled oscillators (NCO) to trigger the locally generated pseudorandom noise sequence, such as coarse acquisition (C/A) code at a desired and programmable phase thereby obtaining the fractional correlation values near the correlation peak and its vicinity at non-uniform spacing. The fractional correlation values are processed in a digital signal processor (DSP) in the frequency domain. The DSP provides exceptional performance in frequency domain processing. The DSP also permits faster correlation peak searching in the frequency domain thereby reducing time-to-first-fix (TTFF).

One advantage of the invention is the use of low cost programmable logic array embodying the glue logic in the circuit. The use of a digital signal processing architecture ensures a low cost multipath mitigation solution using minimal hardware.

Another advantage of the present invention is that the programmable feature of the correlator block provides the flexibility to sample values at different points on correlator function curve to provide an accurate estimation of the correlation function.

Another advantage of the present invention is that it requires minimal calibration. It does not require calibration of each GPS receiver employing the same RF bandwidth.

Another advantage of the present invention is its robustness in mitigating the corruption of correlation values due to low signal strength, or, in the presence of external interferences.

MODES OF CARRYING OUT THE INVENTION AND DETAILED DESCRIPTION

Figure 1:
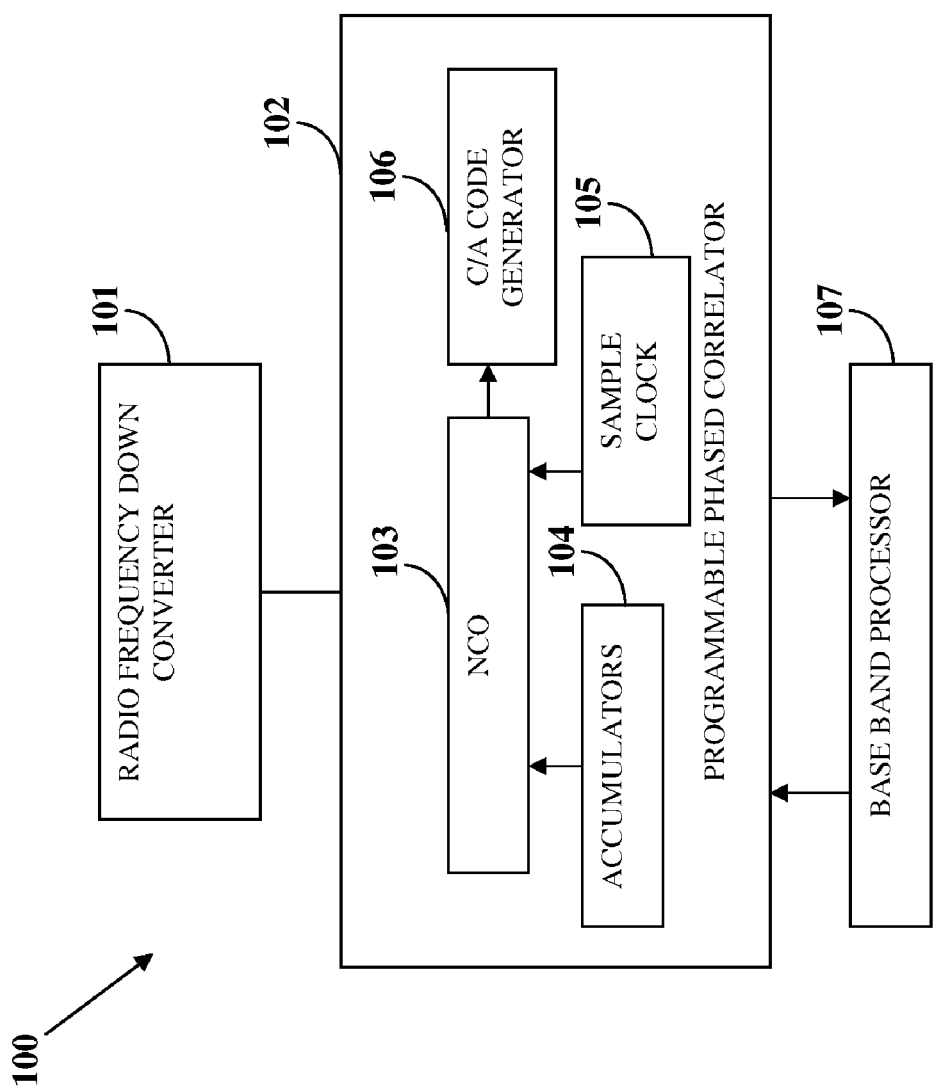
FIG. 1 is a block diagram of a pseudorandom noise ranging receiver comprising a radio frequency down converter, correlator and DSP.

FIG. 1 illustrates a block diagram of a pseudorandom noise ranging receiver system 100. The components of a pseudorandom noise ranging receiver system 100 include a radio frequency (RF) down converter 101, a programmable phased correlator 102, and a base band processor 107. The RF down converter 101 receives the satellite band pass signal and converts it into a base band signal. The programmable phased correlator 102 is connected to and in communication with the RF down converter 101. The generated base band signal is the input to the phased correlator 102. The programmable phased correlator 102 performs fractional correlation near the correlation peak at non-uniform spacing and programmable for the intermediate frequency signals generated from the RF down converter 101. The main functional blocks in a phased correlator block 102 are the numerically controlled oscillator (NCO) 103, accumulators 104, sample clock 105 and pseudorandom noise sequence generator, such as coarse acquisition (C/A) code generator (106).

The processed signal from the phased correlator is transferred to the base band processor 107. The base band processor 107 is either a digital signal processor (DSP) or advanced risk machine (ARM of ARM Inc.). The base band processor 107 determines the correlation peak of the fractional correlation values generated by the correlators in the frequency domain.

The method of estimating the multipath error of pseudorandom noise signal in a pseudorandom noise ranging receiver includes numerous steps. Firstly, determine correlation values at non-uniformly distributed points on a correlation function. Each set of correlation values has a different phase with respect to the previous set of correlation values. Fit the curve for the upper portion of the correlation function by polynomial interpolation. Determine the difference in area between a right section and a left section of the correlation function, the left section covering the area under the correlation function to the left of the correlation peak, and the right section covering the area under the correlation function to the right of the correlation peak. Apply a proportionality constant to the difference in area of the right section and the left section of the correlation function to determine the multipath error in the pseudorandom noise signal. Finally, remove the outliers of the correlation function and filter the multipath errors over multiple code tracking loop invocation periods up to the measurements generation period to improve the accuracy of the estimated multipath. The above mentioned steps are herein described in detail in the illustrated figures below.

Figure 2:
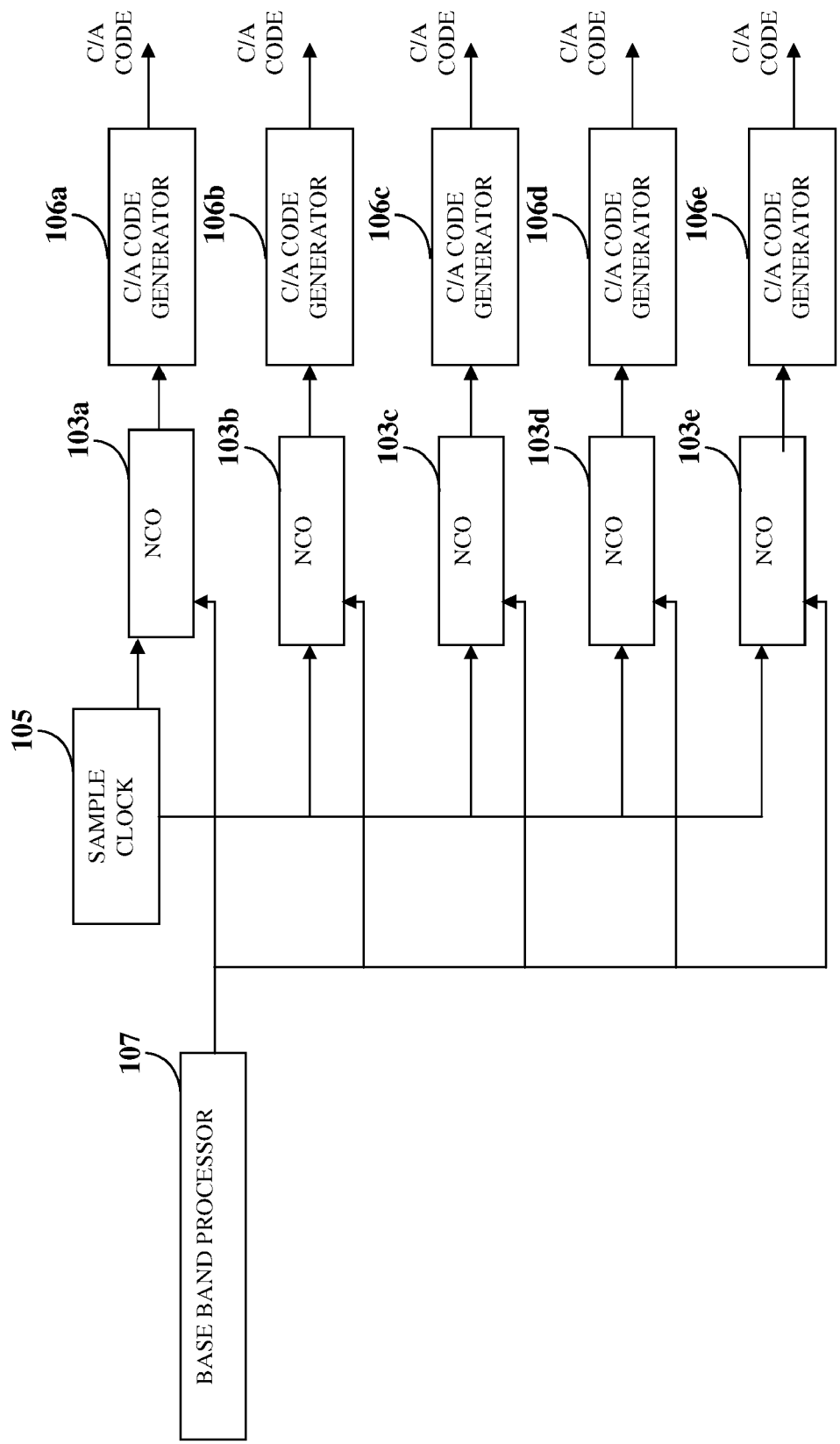
FIG. 2 illustrates a method to generate non-uniform phased coarse acquisition (C/A) code sequences

One embodiment of the pseudorandom noise ranging receiver is a global positioning system receiver (GPS receiver). The pseudorandom noise ranging sequence in a GPS receiver is referred to as coarse acquisition (C/A) codes. FIG. 2 shows the locally generated C/A codes which are programmable and non-uniformly spaced with respect to each other. There are five C/A code generators (106a, 106b, 106c, 106d, 106e), clocked by five different numerically controlled oscillators (NCOs) (103a, 103b, 103c, 103d, 103e). The NCOs are triggered by the same sample clock (105) and programmed by the baseband processor (107) to generate any frequency and phase for the local code.

Using the above mentioned apparatus, the NCOs are programmed to sample the correlation function at different points, which are varied with time so as to get a better estimate of the shape of actual correlation function. This method of sampling at different points on the correlation function is more accurate than the conventional method of having samples at static points on the correlation function. The knowledge of the shape of an actual correlation function obtained by positioning the correlators at different points on the correlation function is critical for estimating the multipath error using the technique described herein.

For example, assume that it is possible to have a code phase spacing resolution of 0.025 chips or 9 deg. The upper portion of the correlation triangle that is of interest for this technique is about 0.3 chips or 108 deg with the correlation function peak included in it. Hence, there are 108/9=12 possible points on the upper portion of the correlation function where the correlation values can be obtained. Number these points as 1, 2, 3, 4, 5, 6, 7, 8, 9, 10, 11, 12 from left to right on the upper portion of the correlation function. If we use five correlators per channel, then these five correlators can sample the correlation values at five of the possible twelve points. Now, the allocation of the points is performed using the following guidelines:

a. One correlator shall be near the extreme left of the upper portion of the correlation function. Therefore, it can be placed at points 1, 2 or 3.
  b. One correlator shall be near the extreme right of the upper portion of the correlation function. Therefore, it can be placed at points 10, 11 or 12.
  c. One correlator shall be near the peak of the correlation function. Therefore, it can be placed at points 6 or 7.
  d. One correlator shall be between the near peak and extreme left correlator. Therefore, it can be placed at points 4 or 5.
  e. The last correlator shall be between the near peak and extreme right correlator. Therefore it can be placed at points 8 or 9.

Following the above technique, for example, at the first instance of satellite tracking loop invocation, the correlator set can be placed at points 1, 4, 6, 8 and 10. At the second instance, the correlator set can be placed at points 2, 5, 7, 9 and 11. At the third instance, the correlator set can be placed at points 3, 5, 7, 9 and 12. And then the correlator combination at the first instance can be repeated.

Figure 3:
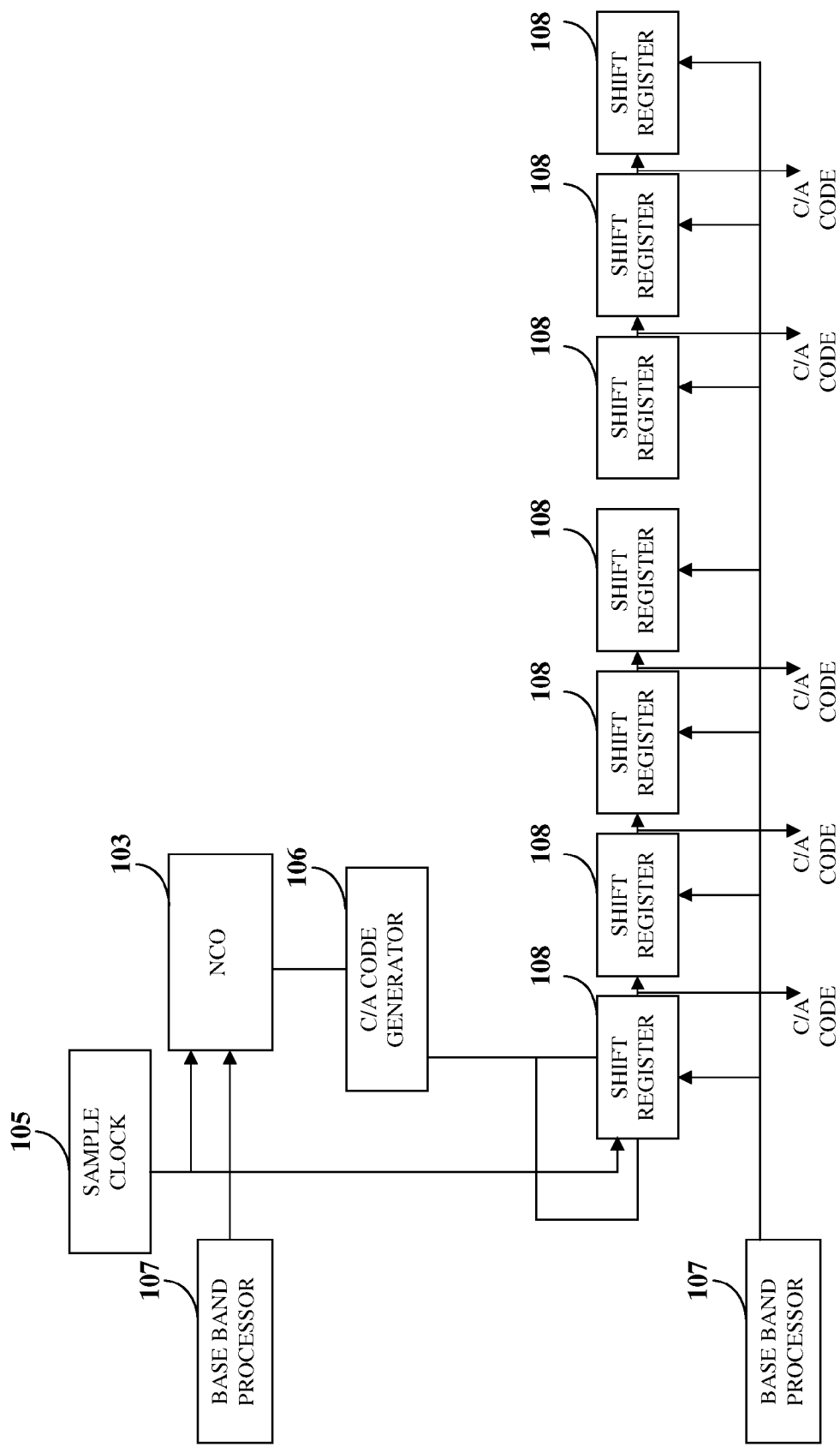
FIG. 3 illustrates another method to generate non-uniformly phased C/A code sequences

FIG. 3 illustrates an alternative method to generate local C/A codes with programmable non-uniform phases. FIG. 3 illustrates one NCO and one code generator. The NCO output triggers the code generator. The code generator generates the GPS C/A code. The C/A code is sent through a long linear shift register (108). The shift register is clocked by a high frequency clock, which is synchronized with the sample clock. The output of each stage of the shift register (108) is tapped to derive C/A code sequences, which are delayed by integer multiples of the triggering clock period. The tap number can be programmed by the baseband processor 107 so as to derive different non-uniformly delayed C/A code for use in the correlation process. The tap numbers are programmed to sample at different points of the correlation function so as to get a better estimate of the shape of actual correlation function as described in the above example.

This approach and structure of the combination of elements used in this invention is different from the conventional techniques. In the conventional technique, the C/A codes are generally equally spaced with respect to the center correlator. For example, in one approach, early and late codes are 0.05 chip or 0.1 chip spaced with respect to the prompt correlator. Further, after the acquisition of a satellite signal, the correlators' spacing is static. In addition, conventionally the correlators are equally spaced with respect to each other. On the contrary, in this invention, the correlator spacing is programmed and non-uniformly spaced so as to get a better estimate of the shape of the correlation function, which is critical for the multipath mitigation method described herein.

Figure 4:
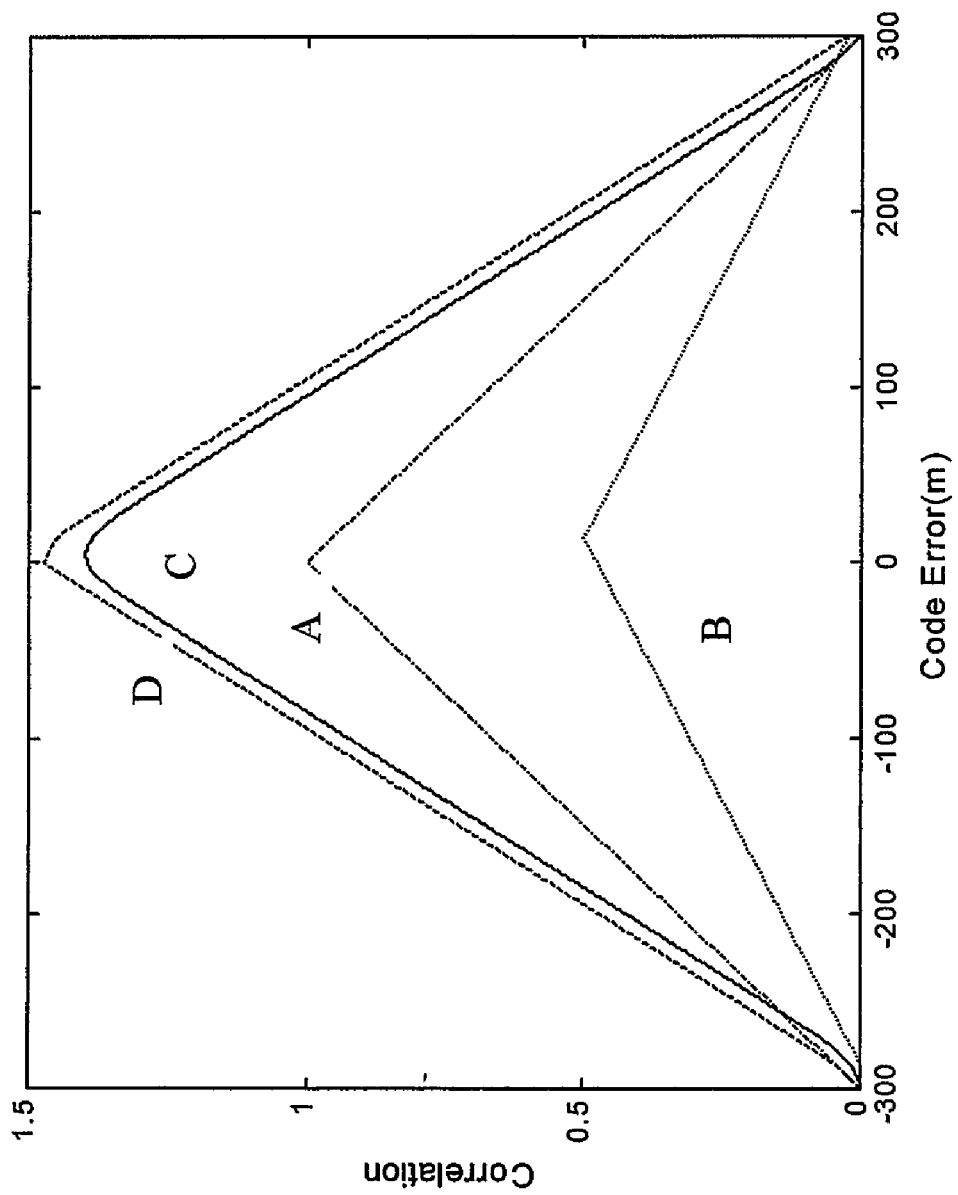
FIG. 4 is a graphical representation of multipath errors due to short delay in-phase multipath signals.
Figure 5:
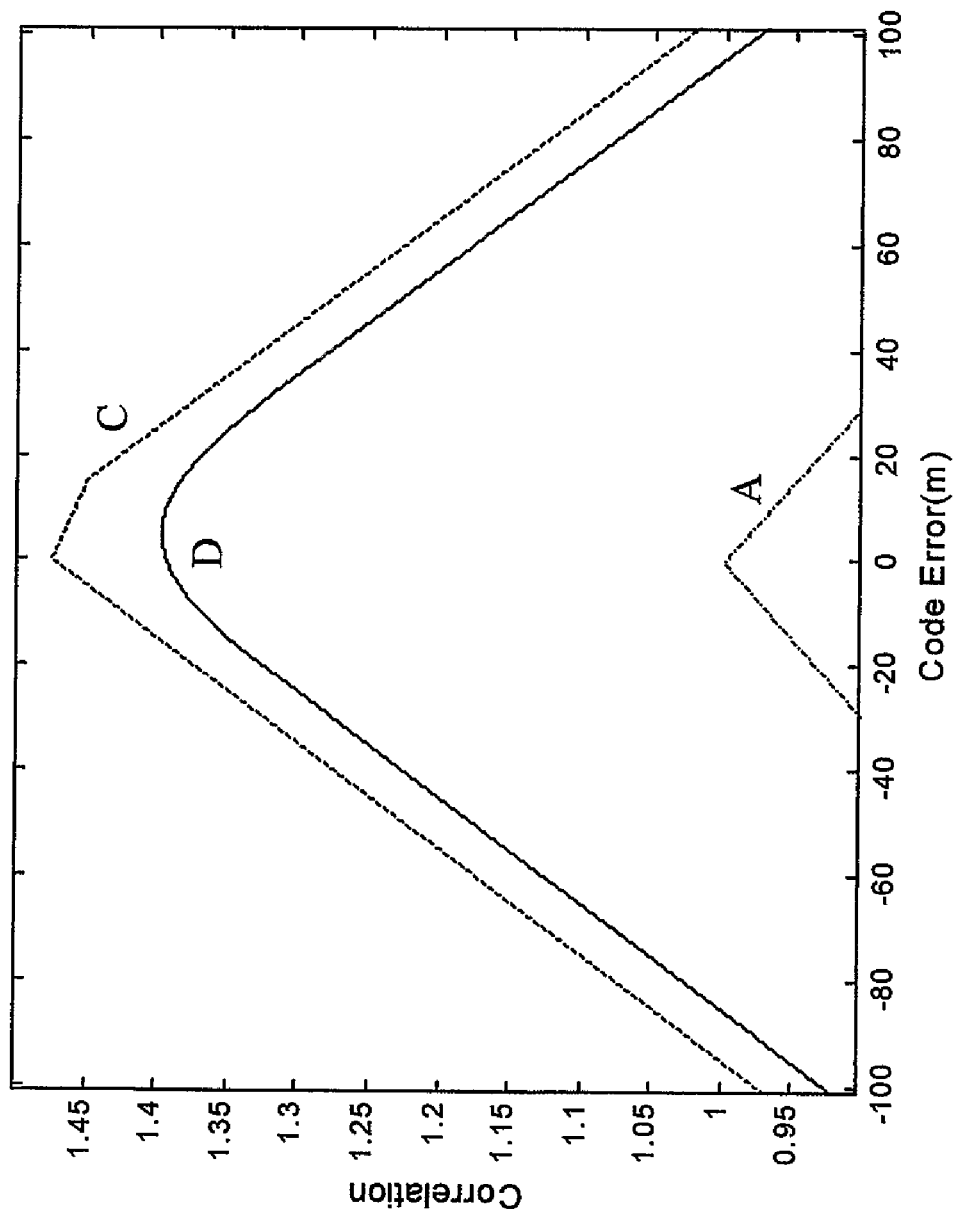
FIG. 5: is a graphical representation of multipath errors due to short delay in-phase multipath signals.

FIG. 4. illustrates the effect of multipath signal on a correlation triangle due to short delay in-phase multipath. FIG. 5 illustrates in detail the peak of the correlation functions shown in FIG. 4. "A" indicates the correlation triangle derived from the direct signal only, and "B" indicates the correlation triangle derived from the reflected signal only. Both these plots are obtained without RF band limitation. The reflected signal has a reflection coefficient of 0.5, multipath delay of 15 meter (0.05 chip) and multipath phase of zero degree. "C" indicates the correlation function due to direct and reflected signals and without any band limitation, whereas "D" indicates the correlation function due to direct and reflected signals and with an RF bandwidth of 8 MHz.

It can be observed that the correlation peaks of curve "A" and "C" are aligned with zero error. However, due to bandpass limitation, the correlation peak of curve "D" is shifted towards the right by about 5 meters. This represents the multipath error if a peak detector or early minus late null-detector, or dot product discriminator is used as a discriminator for code tracking. In-phase multipath signals produce positive multipath errors.

Figure 6:
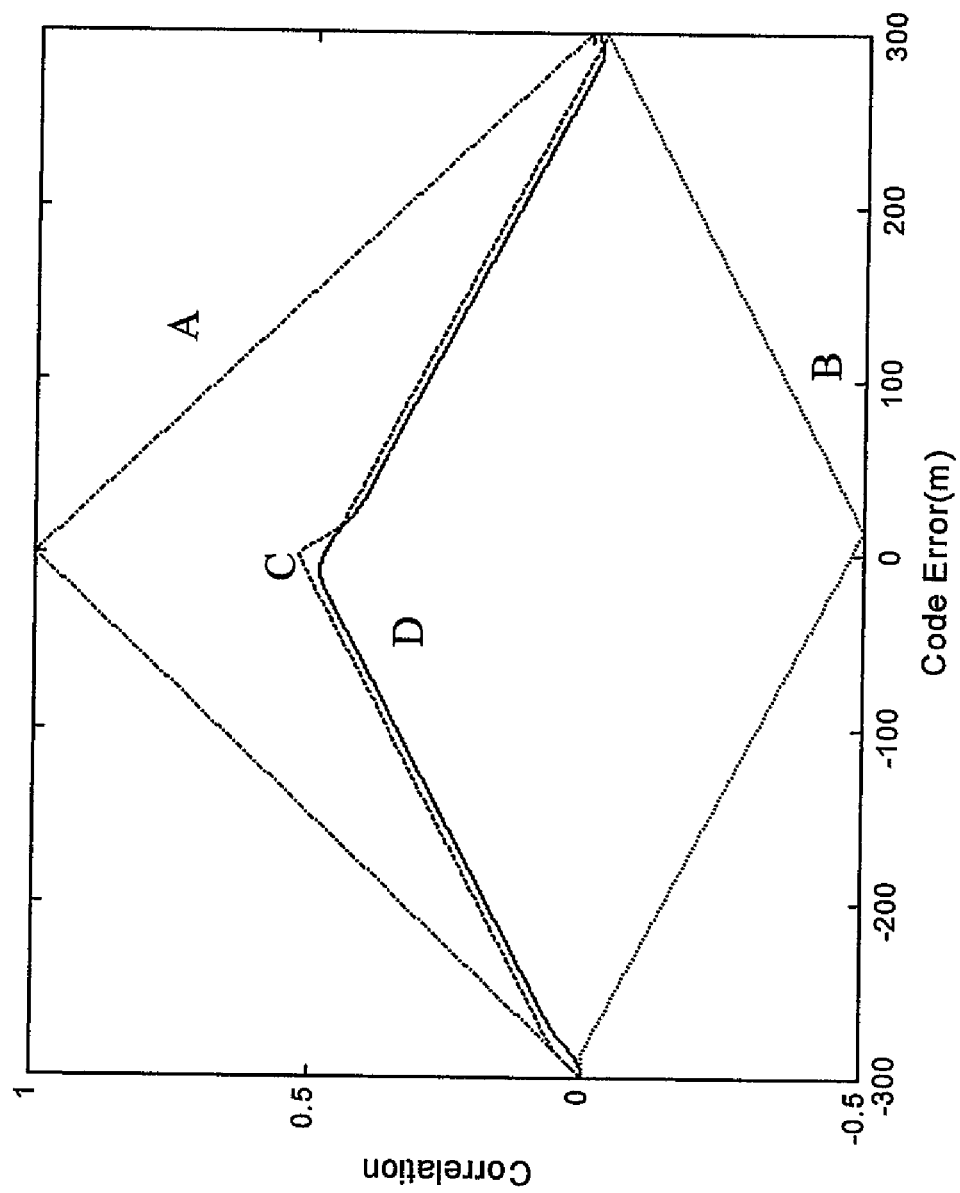
FIG. 6 is a graphical representation of multipath errors due to short delay out-of-phase multipath signals.
Figure 7:
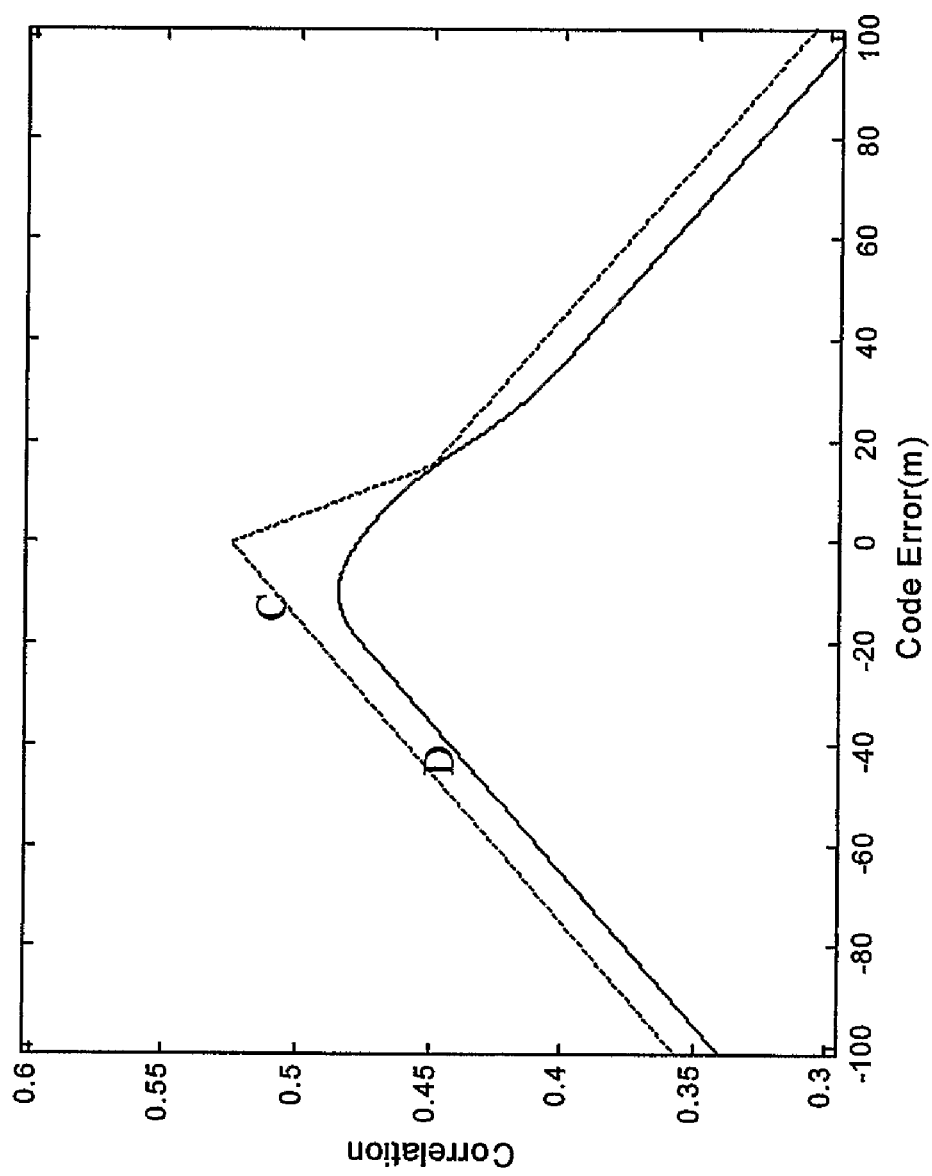
FIG. 7 is a graphical representation of multipath errors due to short delay out-of-phase multipath signals.

FIG. 6 illustrates the effect of multipath signal on correlation triangle due to short delay out-of-phase multipath. FIG. 7 illustrates in detail the peak of the correlation functions shown in FIG. 6. "A" indicates the correlation triangle derived from the direct signal only, and "B" indicates the correlation triangle derived from the reflected signal only. Both these plots are obtained without RF band limitation. The reflected signal has a reflection coefficient of 0.5, multipath delay of 15 meter (0.05 chip) and multipath phase of 180 degrees. In FIG. 6 and FIG. 7, "C" indicates the correlation function due to direct and reflected signals and without any band limitation, whereas "D" indicates the correlation function due to direct and reflected signals and with an RF bandwidth of 8 MHz. It can be observed that the correlation peaks of curve "A" and "C" are aligned with zero errors. However, due to bandpass limitation, the correlation peak of curve "D" is shifted towards the left by about 10 meters. This represents the multipath error if a peak detector, or early minus late null-detector or dot product discriminator is used as a discriminator for code tracking. Out-of-phase multipath signal produces negative multipath errors.

Figure 8:
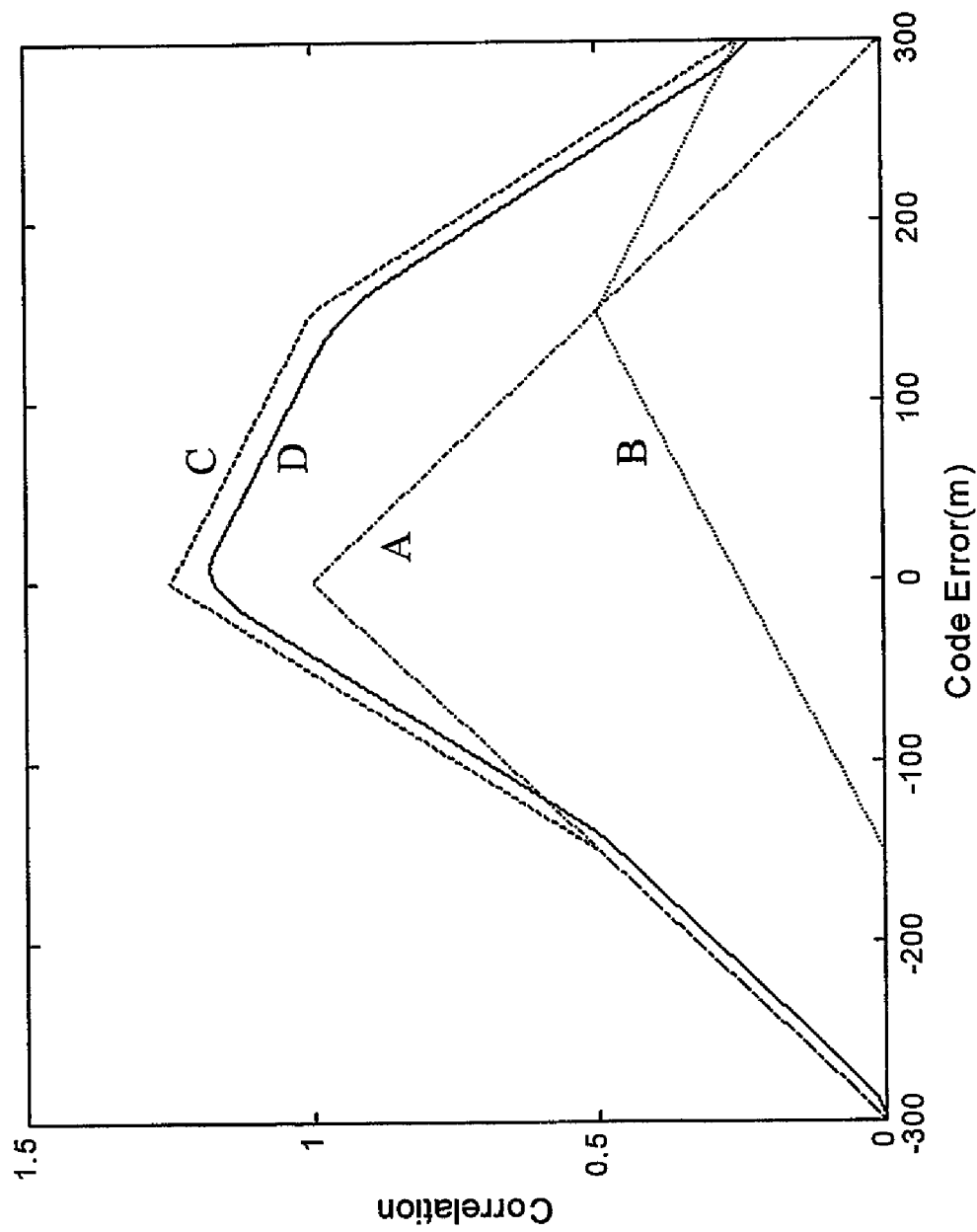
FIG. 8 is a graphical representation of multipath errors due to long delay in-phase multipath signals.
Figure 9:
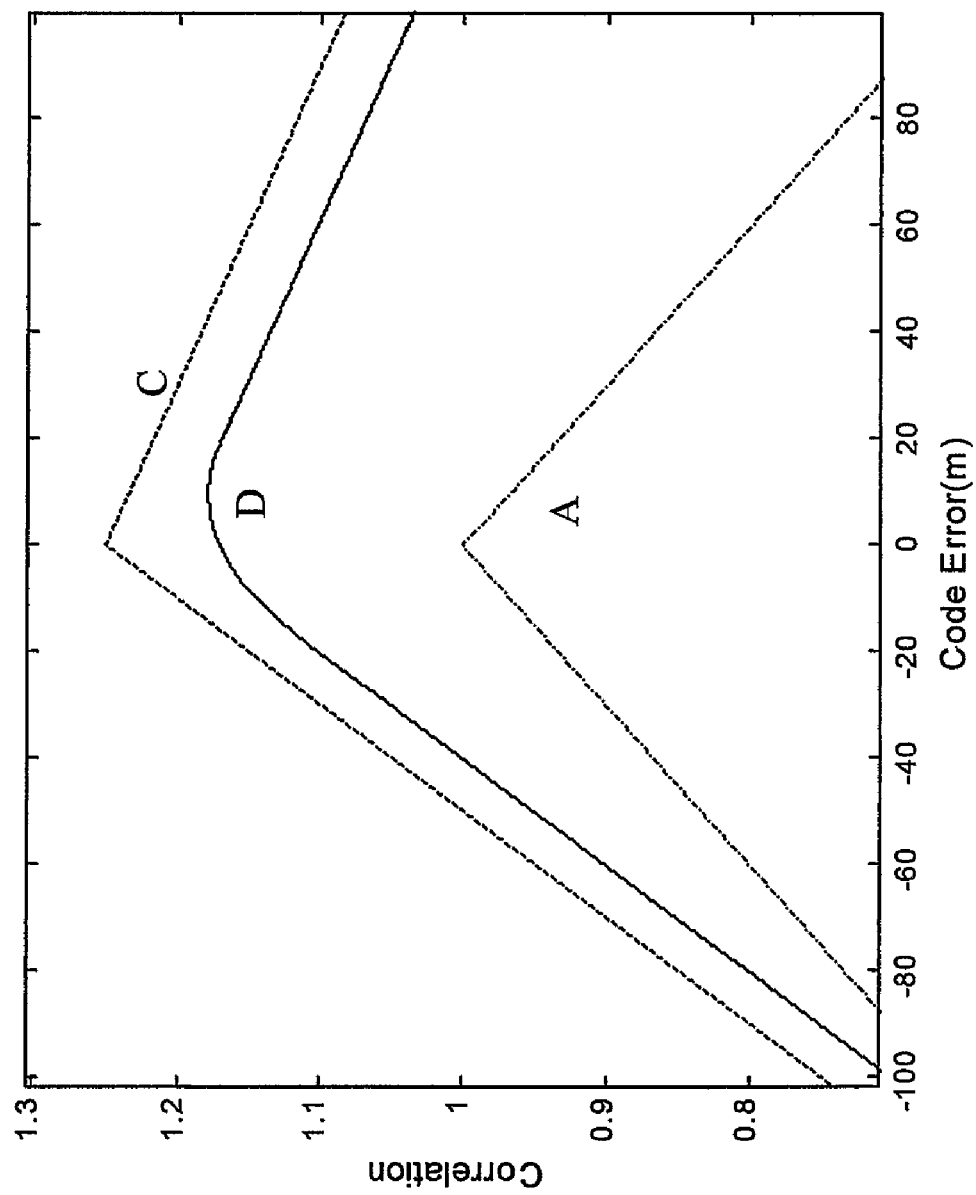
FIG. 9 is a graphical representation of multipath errors due to long delay in-phase multipath signals.
Figure 10:
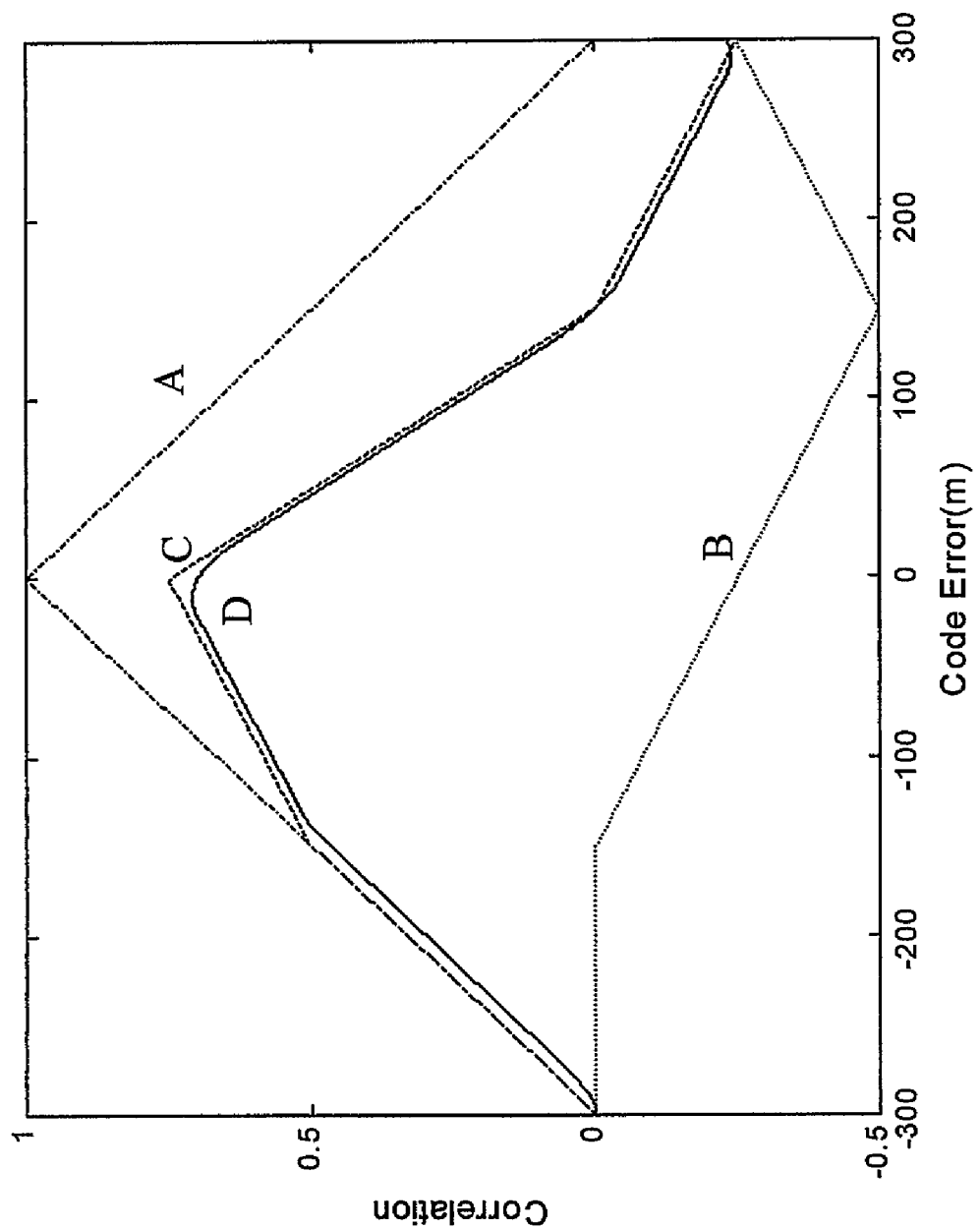
FIG. 10 is a graphical representation of multipath errors due to long delay out-of-phase multipath signals.
Figure 11:
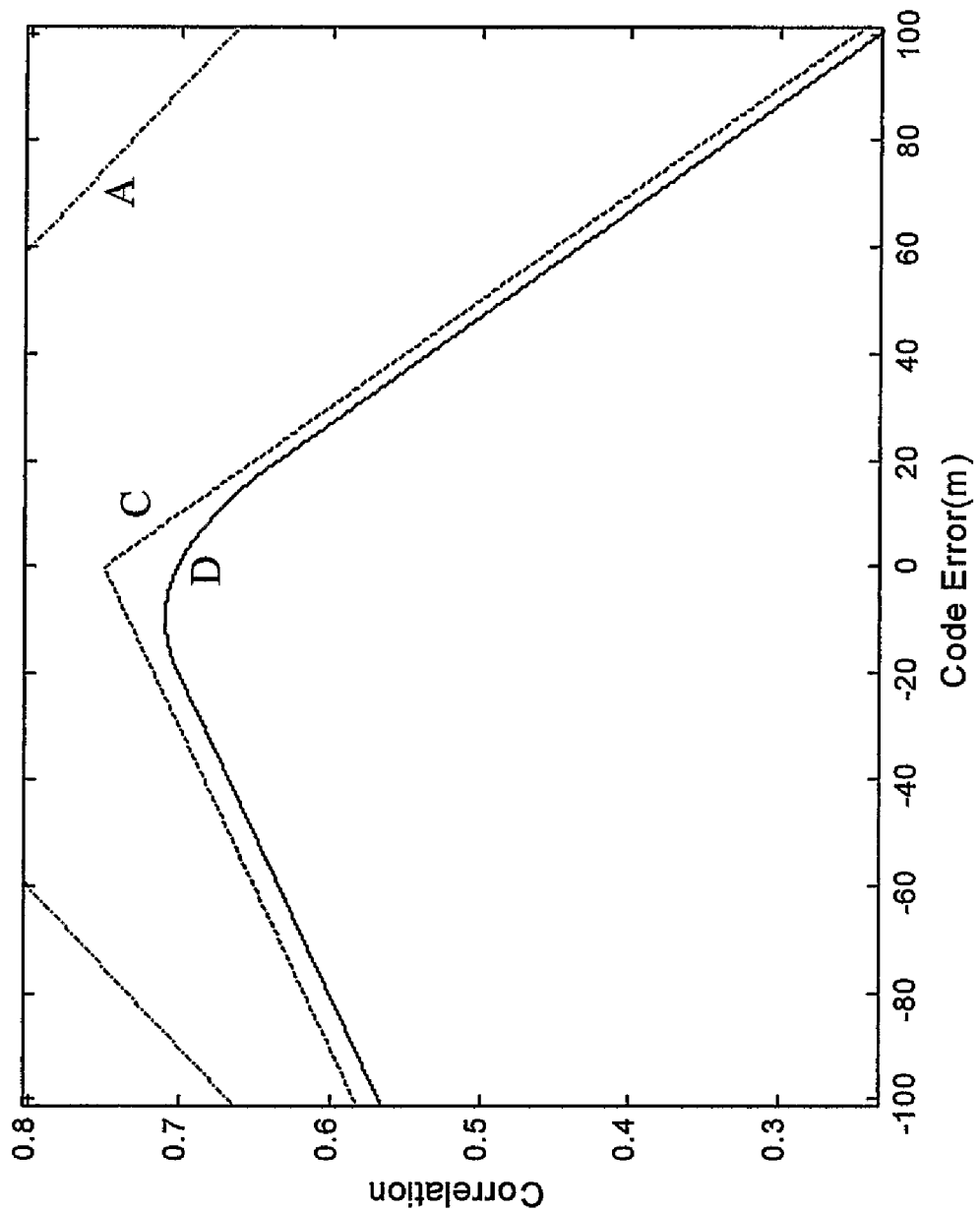
FIG. 11 is a graphical representation of multipath errors due to long delay out-of-phase multipath signals.

FIG. 8. illustrates the effect of the multipath signal on the correlation triangle due to long delay in-phase multipath. FIG. 9 illustrates in detail the peak of the correlation functions shown in FIG. 8. Similarly, FIG. 10 illustrates the effect of the multipath signal on the correlation triangle due to long delay out-of-phase multipath. FIG. 11 illustrates in detail the peak of the correlation functions shown in FIG. 10. "A" indicates the correlation triangle derived from the direct signal only, and "B" indicates the correlation triangle derived from the reflected signal only. Both these plots are obtained without RF band limitation. The reflected signal here has a reflection coefficient of 0.5 and multipath delay of 150 meter which is equivalent to 0.5 chip. The multipath phase is zero degree for FIG. 8 and FIG. 9, and it is 180 degrees for FIG. 10 and FIG. 11. "C" indicates the correlation function due to direct and reflected signals and without any band limitation, "D" indicates the correlation function due to direct and reflected signals with an RF bandwidth of 8 MHz.

It can be observed that the correlation peaks of curve "A" and "C" are aligned with zero error. However, due to bandpass limitation, the correlation peak of curve "D" is shifted towards the right by about 10 meters in FIG. 8 and FIG. 9; and towards the left by about the same amount in FIG. 10 and FIG.

11. This represents the multipath error if a peak detector or early minus late null-detector or dot product discriminator is used as a discriminator for code tracking. Further, in-phase multipath signals produce positive multipath errors and out-of-phase multipath signals produce negative multipath errors.

Figure 12:
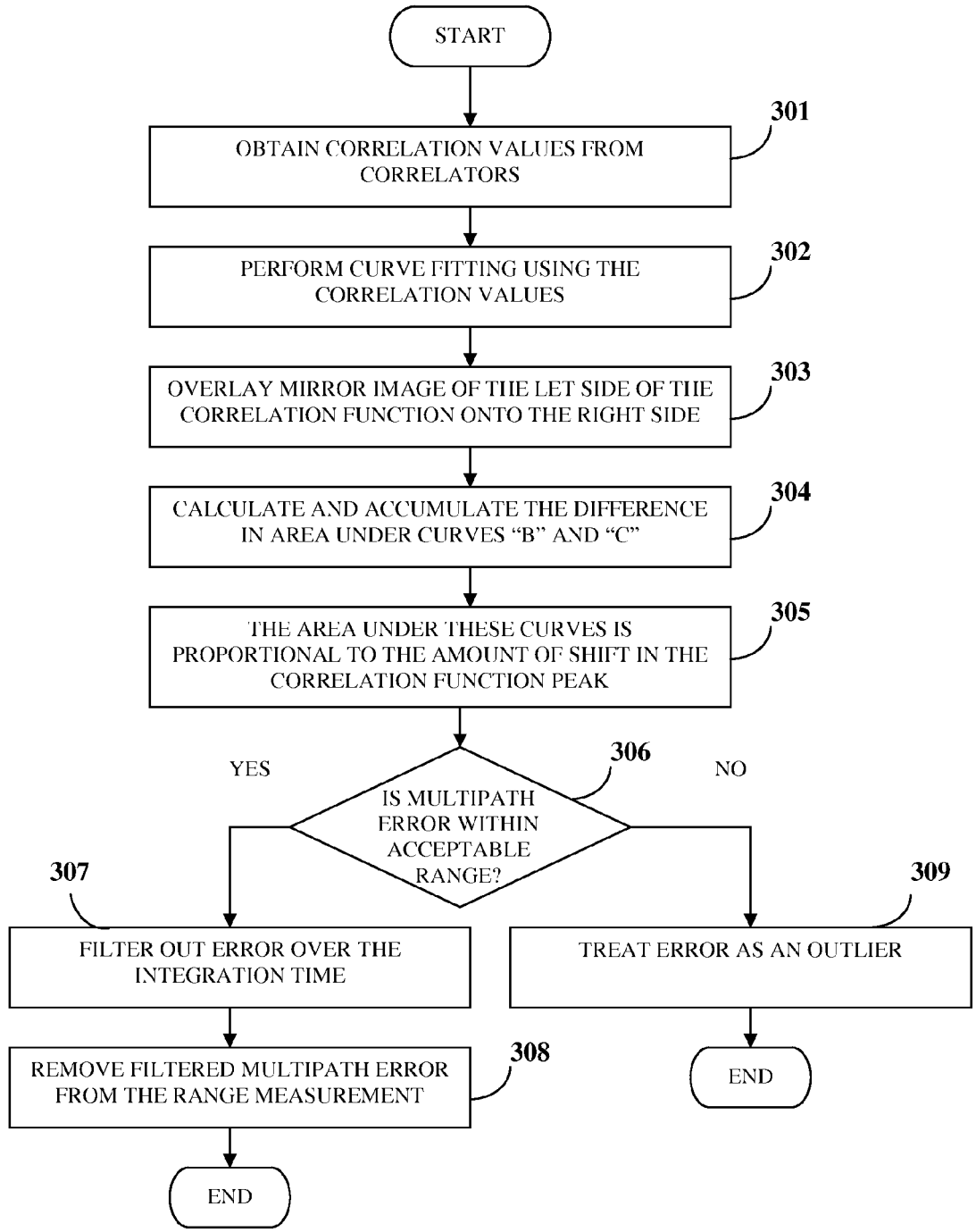
FIG. 12 is a flowchart illustrating the asymmetry technique used for multipath mitigation.

We now describe how these shifts in the correlation function peak, i.e., multipath errors are estimated by exploiting the asymmetry of the correlation function. FIG. 12 illustrates the steps required to perform the operation to estimate peak shift.

First, the correlation values from the correlators are obtained (301). Assume the correlation values to be R1, R2, R3, R4 and R5. Assume the spacing between R1 and R2 is $\tau_{12}$, spacing between R1 and R3 is $\tau_{13}$, spacing between R1 and R4 is $\tau_{14}$, and spacing between R1 and R5 is $\tau_{15}$. The correlators need not be uniformly spaced. In fact they can be adjusted. Further assume $\tau_{15}$ is 0.3Tc, where Tc is the GPS C/A code width. A minimum of 4 correlators is required for this technique. The use of 5 correlators described in FIG. 12 is for purposes of an example only. The higher the number of correlators, the better is the estimation accuracy. Further, $\tau_{15}$ could be different from 0.3Tc and the value of $\tau_{15}$ used here only as an example of the process.

The Lagrange polynomial method, for example, is used to perform curve fitting using the correlation values R1, R2, R3, R4 and R5 (302). Any other equivalent method may also be used for curve fitting. During steady state tracking, it can be assumed that R1 through R5 shall contain values of the upper portion of correlation function. The Lagrange polynomial method derives the coefficients of the curve. Assume the coefficients of the polynomial function are $c_1, c_2, c_3, c_4$ and $c_5$. It is therefore possible to reconstruct the upper portion of the correlation function using these coefficients. The function represented is: $r(\tau)=c_1\tau^4+c_2\tau^3+c_3\tau^2+c_4\tau+c_5$, where $\tau$ is the code phase. Hence, the code phase at which the correlation function attains the maximum value or the peak can be derived by inserting different values of $\tau$ in the above equation.

After the peak of the correlation function is detected, a transformation is done to overlay the mirror image of the left part of the correlation function on to the right side (303). If there is no multipath, then the correlation function is symmetric and the left part overlaps the right part of the correlation function. However, if there is a multipath signal, the correlation function becomes asymmetric and the left part does not overlap the right part.

Figure 13:
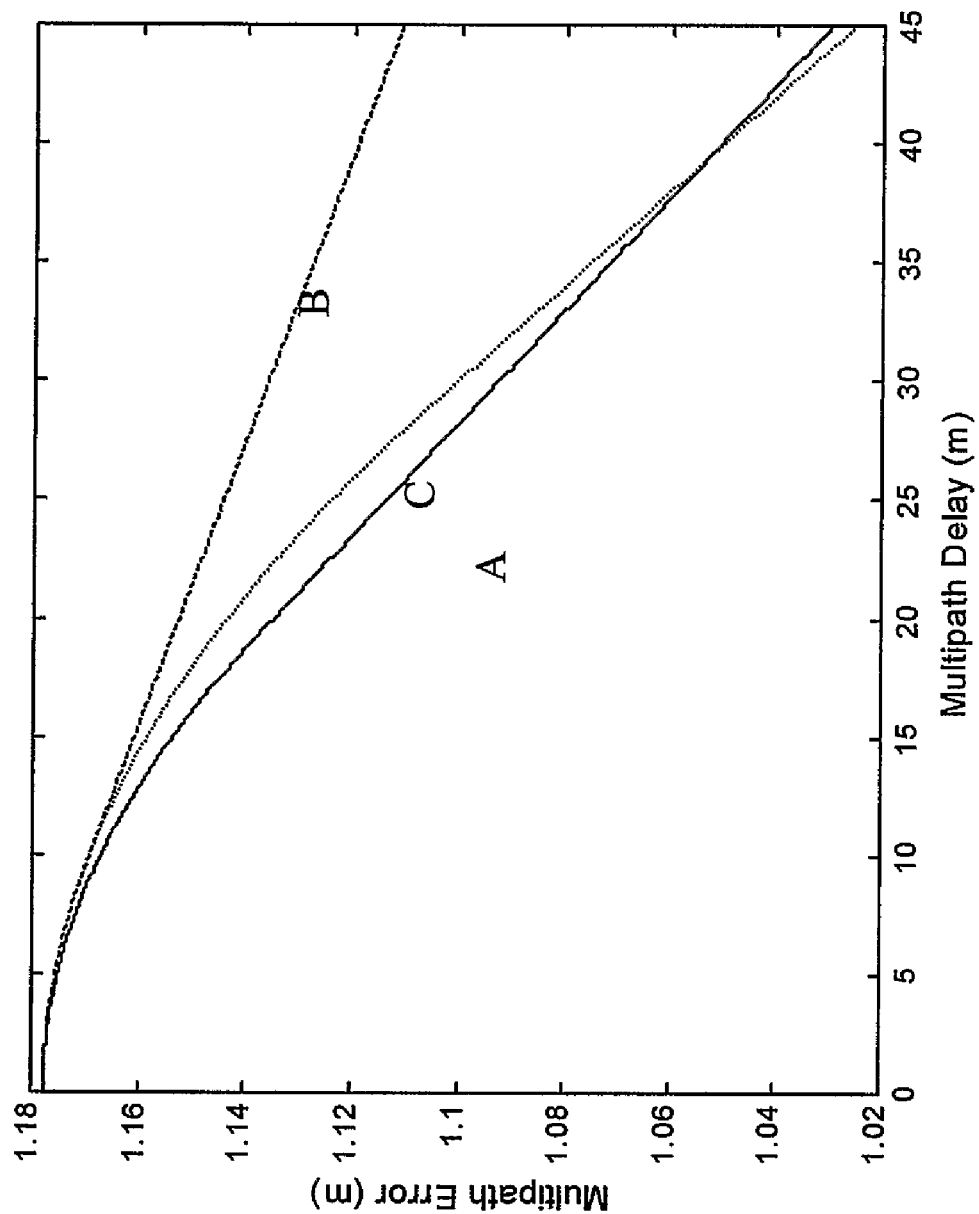
FIG. 13 is a graphical illustration of asymmetry in correlation function due to in-phase multipath signal with reflection coefficient=0.5, multipath delay=half chip and RF bandwidth of 8 MHz

FIG. 13 exemplifies the asymmetry in correlation function due to an in-phase multipath signal with a reflection coefficient of 0.5 and a multipath delay of 150 meters, with an RF bandwidth of 8 MHz. "A" denotes the right upper part of the band limited correlation function when there is no multipath signal. "B" denotes the right upper part of the correlation function when there is a multipath signal and "C" denotes the mirror image of the left upper part of the correlation function when there is a multipath signal. It is apparent in FIG. 13 that multipath signal has created a gulf between the right part and mirror image of the left part of correlation function.

Figure 14:
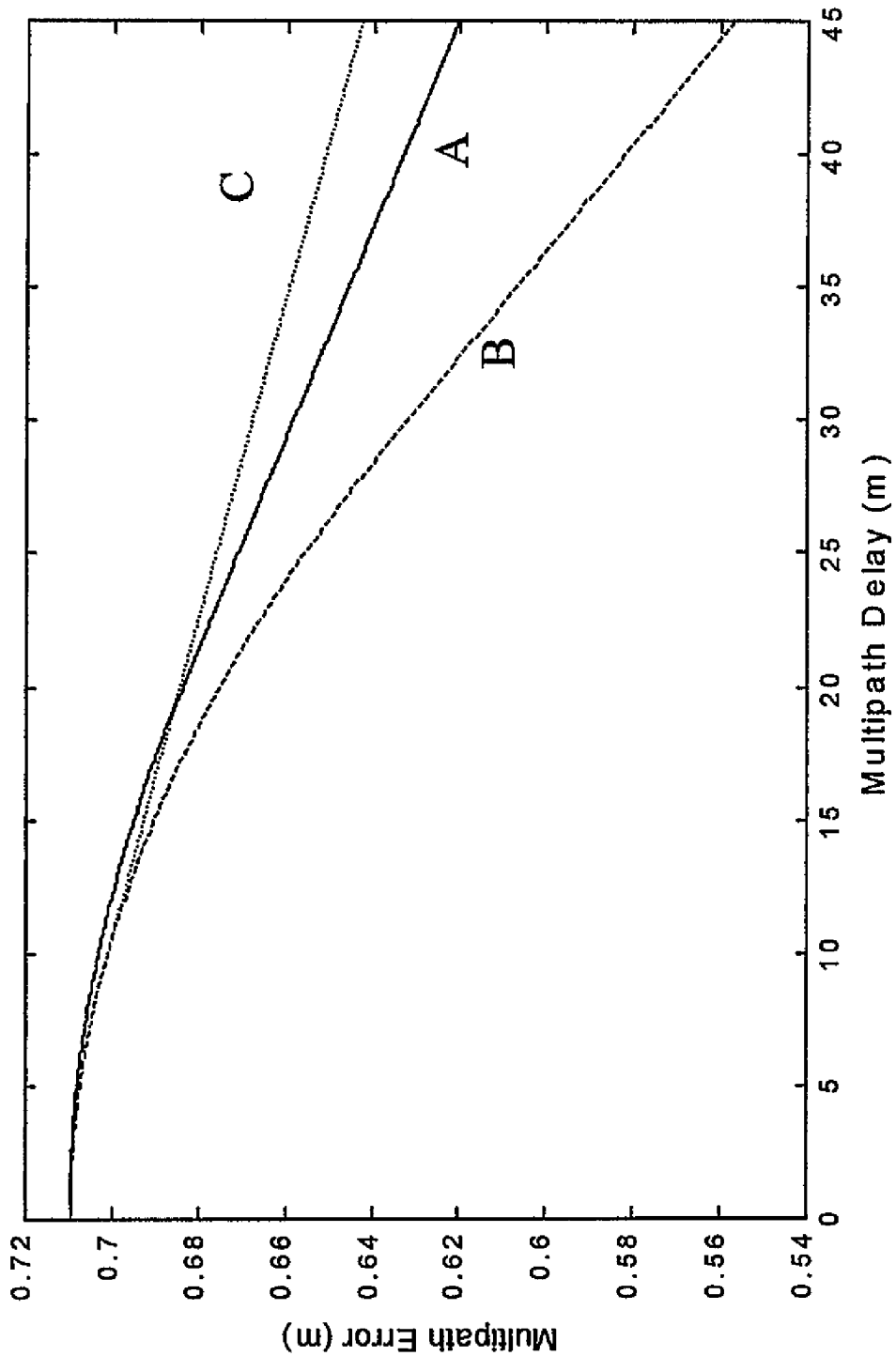
FIG. 14 is a graphical illustration of in correlation function due to out-of-phase multipath signal with reflection coefficient=0.5, multipath delay=half chip and RF bandwidth of 8 MHz.

FIG. 14 exemplifies the asymmetry in the correlation function due to out-of-phase multipath signal with reflection coefficient of 0.5 and multipath delay of 150 meters, with an RF bandwidth of 8 MHz. "B" and "C" curves change their places with respect to the curves in FIG. 13.

The difference in area under the curves "B" and "C" is calculated and accumulated (304). This difference is positive for in-phase multipath, and negative for out-of-phase multipath signal. The area under these curves is proportional to the amount of shift in the correlation function peak (305), i.e., the area under these curves is proportional to the multipath error.

The multipath error is represented as the shift in the correlation peak. The multipath error is proportional to the area under the two curves described above in FIG. 14. The proportionality constant depends upon the RF bandwidth. The proportionality constant is determined by sending a single multipath signal delayed with respect to the direct signal, and determining a shift in the peak, i.e., multipath error, and the area under the two curves described above. Thereafter the ratio between the multipath error and the area under the two curves is determined. The proportionality constant is valid for all delays and all reflection coefficients of the multipath signal.

After the multipath error is computed, a check is conducted to determine whether the error is within the acceptable range (306). If the error is within the acceptable range, the error is filtered over the integration time (307). If the error is outside the acceptable range, it is treated as an outlier (309). The outlier is not used in the filtering process and the program can be exited (310). The filtered multipath error is removed from the range measurement (308). Acceptable multipath errors during the code tracking loop invocation period can be filtered using a least square estimator, or a Kalman filter, or any other suitable estimation technique.

Figure 15:
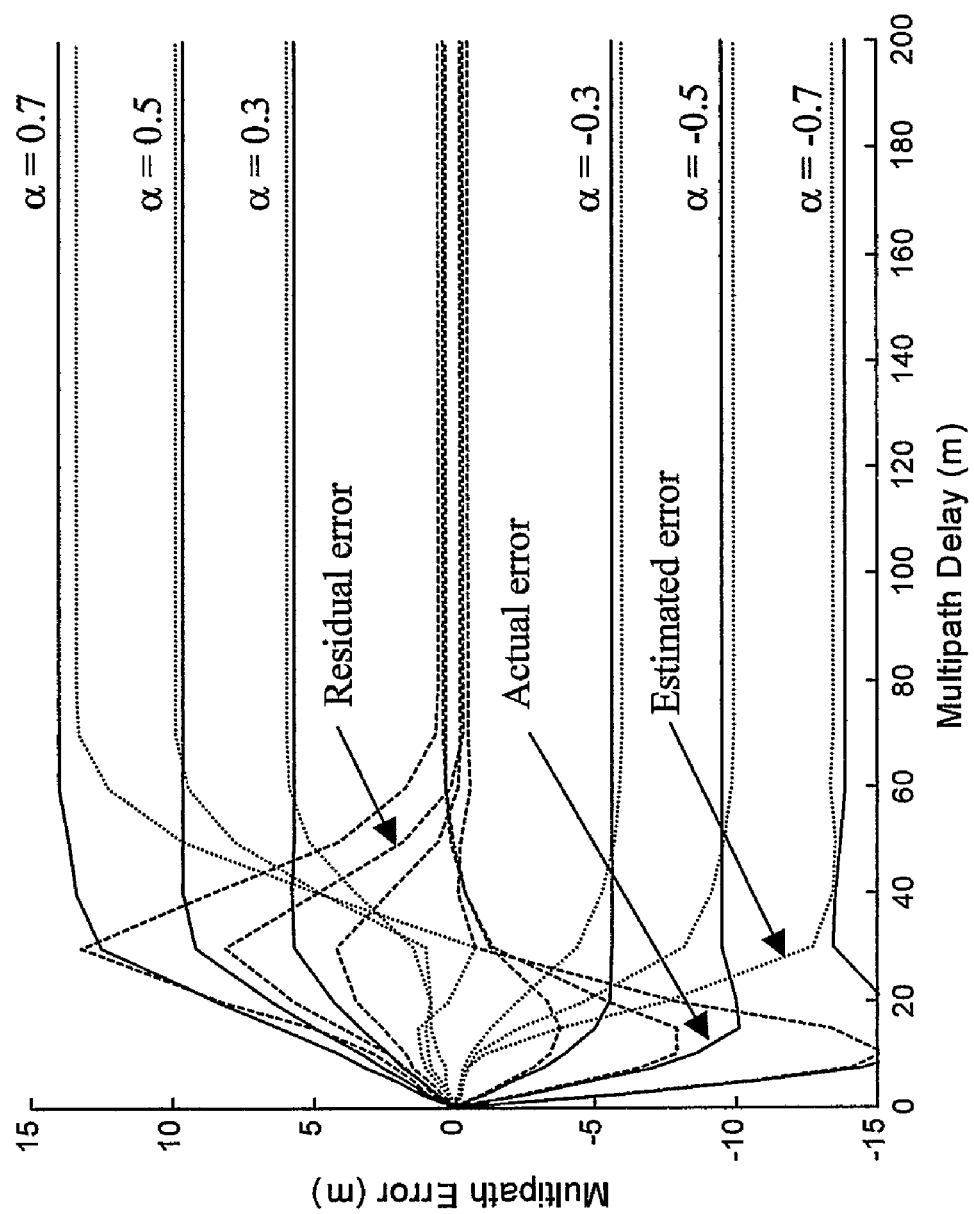
FIG. 15 is a graphical illustration of multipath mitigation depicting actual, estimated and residual errors for a RF bandwidth of 8 MHz.

FIG. 15 exemplifies the multipath error envelopes due to the reflection coefficients of 0.3, 0.5 and 0.7 and for in-phase and out-of-phase multipath signals for different multipath delays. The RF bandwidth used in this example is 8 MHz. The solid lines indicate the actual multipath error if a null-detector is used as a discriminator. The small dashed lines indicate the estimated multipath errors. The difference between the actual multipath errors and estimated multipath errors are shown using large dashed lines.

It is apparent from FIG. 15 that this method is very effective in removing medium and long delay multipath. In fact, the estimated error is very close to the actual multipath error and the residual multipath error is close to zero for all the cases shown here except for the short delay multipath. Since this method is shown to be effective for both in-phase and out of phase multipath conditions, it can be inferred that the method is effective for multipath signal with any phase with respect to the direct signal.

Figure 16:
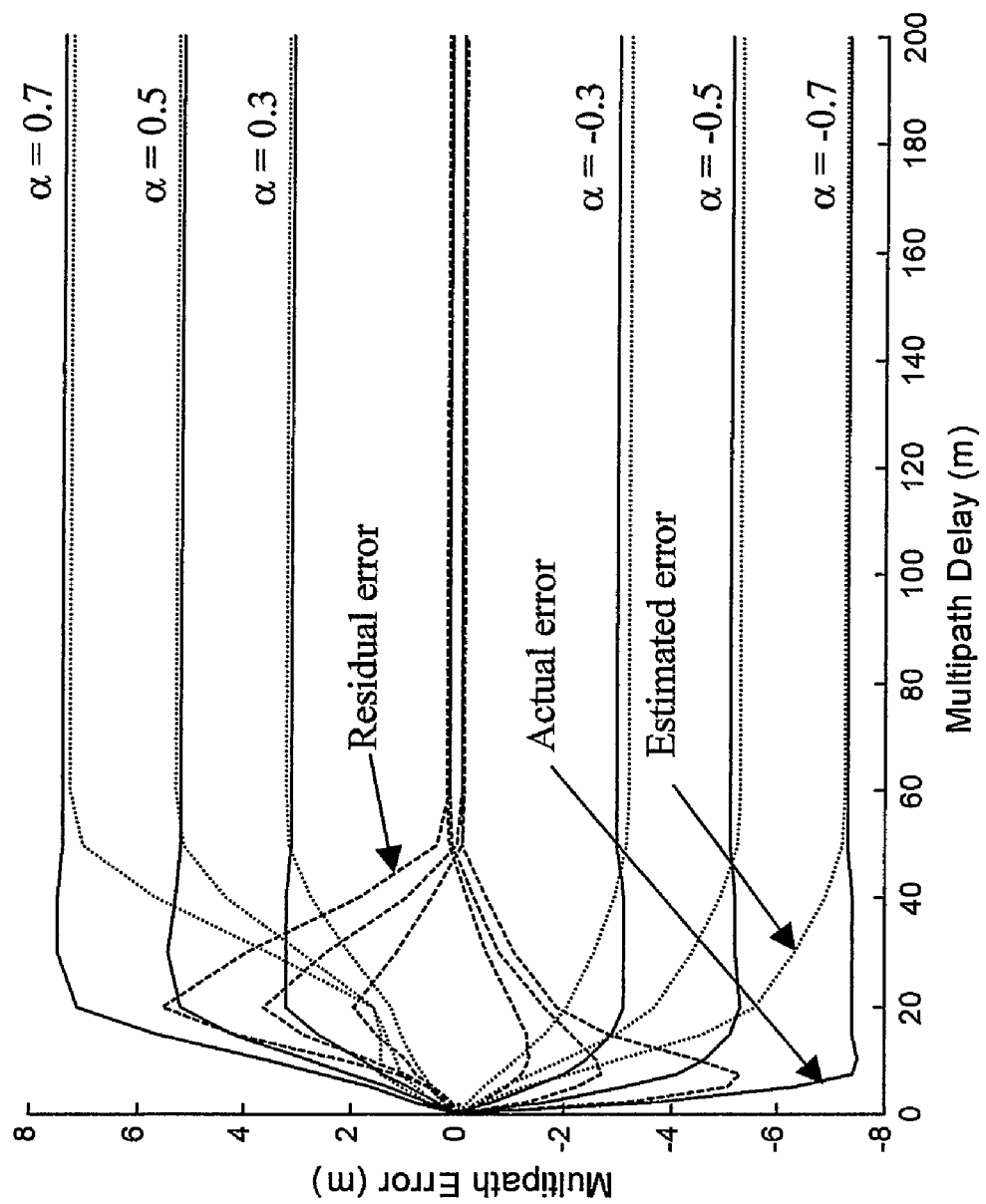
FIG. 16 is a graphical illustration of multipath mitigation depicting actual, estimated and residual errors for a RF bandwidth of 16 MHz.

FIG. 16 illustrates the multipath error envelopes similar to FIG. 15. In this example, the RF bandwidth used is 16 MHz. In this case, the estimated multipath errors match the actual multipath errors very closely.

Figure 17:
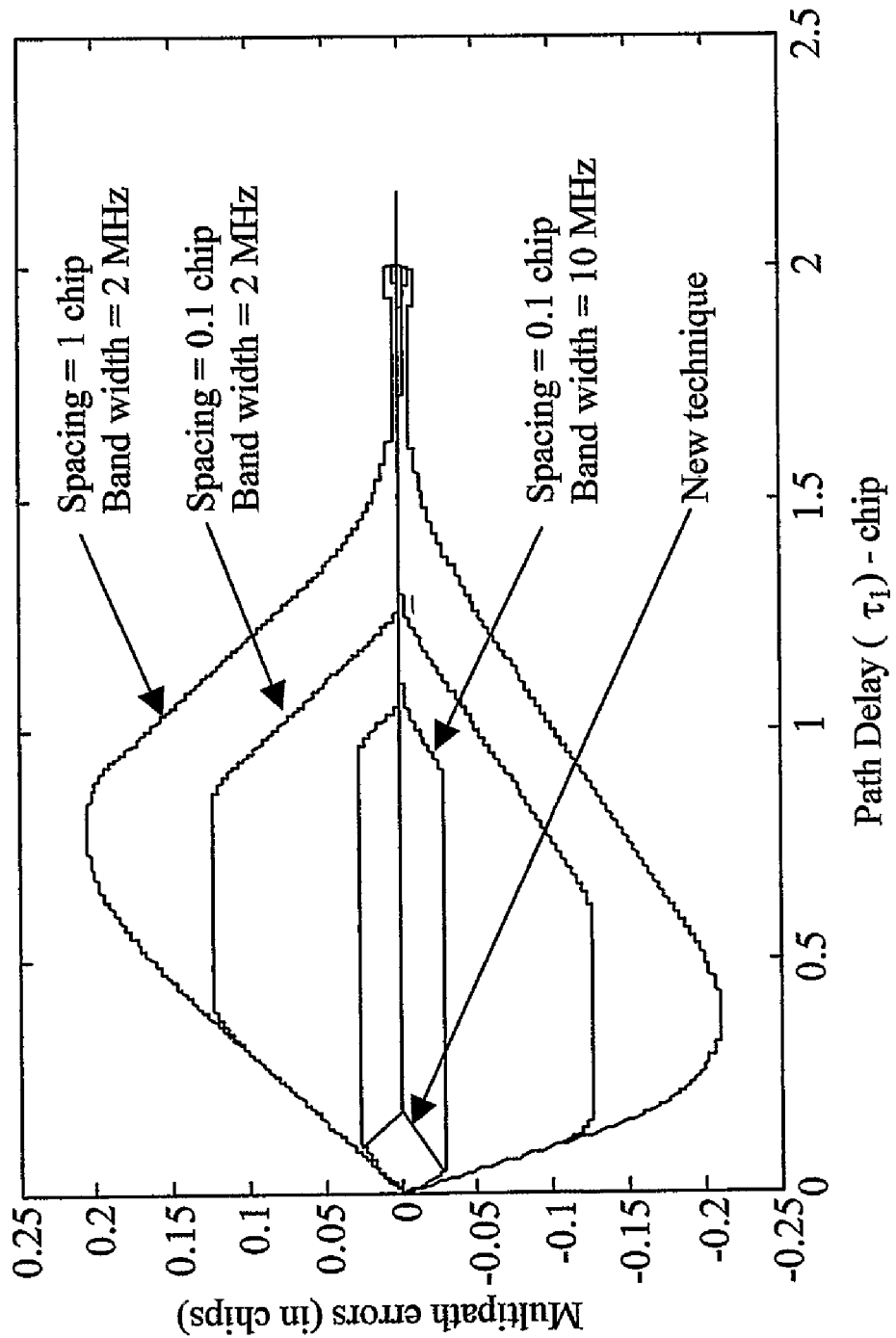
FIG. 17 is a graphical illustration of multipath error envelopes.

FIG. 17 illustrates the multipath error envelopes for code using different multipath mitigation techniques. The x-axis of the figure represents the multipath delay and the y-axis represents the multipath error in the unit of chips. The upper portion of the curves corresponds to the in-phase multipath, whereas the lower portion of the curves corresponds to the out-of-phase multipath.

The outermost curve is the multipath error envelope using a standard correlator with 1 chip correlator spacing between early and late correlators and having an RF bandwidth of 2 MHz. It is apparent from FIG. 17 that the maximum multipath error that is experienced is about 0.2 chips or 60 meters. Further, the reflected signals with delays of up to 450 meters contribute to the multipath error. This is a typical example of the multipath error of a low cost standard GPS receiver. The second curve from the outermost curve is the multipath error envelope using 0.1 chip correlator spacing between early and late correlators and having an RF bandwidth of 2 MHz. The third curve from the outermost curve shows the multipath error envelope using a 0.1 chip correlator spacing between early and late correlators and having an RF bandwidth of 10 MHz. It is clear from FIG. 17 that 0.1 chip spacing without the increase in RF bandwidth does not yield good multipath mitigation results. Further, even in the case of the 0.1 chip spacing and 10 MHz bandwidth, the reflected signals with delays of up to about 315 meters contributes to some amount of residual multipath error. The innermost curve, which encloses a small area shows the multipath error envelope using the technique described in this invention. The reflected signals with delays of up to approximately 45 meters only contributes to the multipath error, a significant advantage compared to the currently available correlator technology of similar complexity.

Multipath error is computed by using the asymmetry technique at a rate of the code tracking loop invocation rate. However, in a receiver, typically the measurements are generated at a rate that is much lower compared to the code tracking loop invocation rate. Typically, the code tracking loop may be invoked at a rate of 50 Hz and measurements generated at a rate of 1 Hz or 10 Hz. Therefore, it is possible to average the multipath errors over the measurement generation period to improve the accuracy of the estimated multipath.

For example, if the multipath errors found using the asymmetry technique at ten successive invocation of code tracking loop are 3.5 m, 3.2 m, 3.9 m, 2.3 m, 3.1 m, 2.1 m, 2.7 m, 4.3 m, 3.6 m, and 3.3 m, the simple average of these values is 3.2 m. This average value is less noisy than the individual estimated values. The average value can then be removed from the measurements to get a better accuracy of range measurement.

Under weak signal strength conditions or in presence of interferences, one or more correlation values may get corrupted. If the correlation values are directly used for null-detection or for peak detection in a discriminator, this would give rise to an erroneous discriminator output and thereby erroneous tracking of the signal. For applications addressing weak signal strength conditions or in the presence of interferences, multiple correlators are employed to estimate the correlation function. The correlation values from these correlators are used to estimate the correlation function peak and the shift of the correlation function peak. If one or more of the correlation values is corrupted, then the value corresponding to the correlation function peak shift will also be affected. This value is checked against a threshold to detect if there is an outlier in the correlation values.

For example, if the correlators are placed at 0, 20 degrees, 35 degrees, 50 degrees and 70 degrees and their corresponding values are 0.90, 0.96, 0.99, 0.7, 0.91, then it is clear that the fourth correlator provides a corrupted value. When these values are used for curve fitting and the differences of the upper right and mirror image of upper left part are summed up, the summation is a large value that can be easily detected. This makes the present method robust against corruption of correlation values due to low signal strength, or, in the presence of interferences.

While the above description contains much specificity, it should not be construed as limitations on the scope of the present invention, but rather as an exemplification of a few preferred embodiment thereof. Many other variations are possible. Accordingly, the scope of the present invention should be determined not by the embodiment(s) illustrated, but by the appended claims and their legal equivalents.

INDUSTRIAL APPLICABILITY

The pseudorandom noise ranging receiver is used in civilian and military positioning, velocity, and timing applications. The measurement of position, velocity and time needs to be accurately determined. The accuracy of the range measurements conducted by a pseudorandom noise ranging receiver depends upon the accuracy of alignment of the incoming direct signal from the satellite with the locally generated PRN signal of the pseudorandom noise ranging receiver. Multipath signals affect the accuracy of the estimated range.

The present invention is an improved PRN range measurement method and apparatus that utilizes the asymmetry of the correlation function resulting from multipath signals to determine the measurement range error. The apparatus provides improved measurement accuracy and reliability by employing the asymmetry technique of multipath estimation and use of non-uniformly spaced correlators for better estimation of correlation function. This architecture is suitable for a variety of applications requiring faster acquisition and provides better accuracy and lower hardware cost. This apparatus and technique is also applicable for different types of pseudorandom signals transmitted by the GPS satellites.

We claim:

1. A method of estimating the multipath error of pseudorandom noise signal in a pseudorandom noise ranging receiver, comprising the steps of:
   (a) determining correlation values at programmable and non-uniformly distributed points on a correlation function, wherein each set of correlation values has a different phase with respect to a previous set of correlation values;
   (b) curve-fitting the upper portion of the correlation function by polynomial interpolation for determining the code phase at which the correlation function peaks;
   (c) determining a difference in area between a right section and a left section of the correlation function, the left section covering the area under the correlation function to the left of the correlation peak and the right section covering the area under the correlation function to the right of the correlation peak; and,
   (d) applying a proportionality constant to the difference in area of the right section and the left section of the correlation function to determine the multipath error in the pseudorandom signal.

2. The method of claim 1, wherein the step of applying a proportionality constant to the difference in area of a right section and a left section of the correlation function, comprises the steps of:
   (a) transmitting a delayed predetermined calibrated multipath signal with a direct signal to the pseudorandom signal receiver and determining the correlation function and the shift in the correlation peak due to multipath signal, and thereafter determining the difference in area between the right section and the left section of the correlation function;
   (b) determining a proportionality constant derived from the linear relationship between the shift in the correlation function peak and the area between the right section and the left section of the correlation function; and
   (c) applying said proportionality constant to the difference in area of the right section and the left section of the correlation function to determine the multipath error in the pseudorandom signal.

3. A method of estimating the multipath error of pseudorandom noise signal in a pseudorandom noise ranging receiver, comprising the steps of:
   (a) determining correlation values at non uniformly distributed points on a correlation function, wherein each set of correlation values has a different phase with respect to a previous set of correlation values;

(b) curve fitting an upper portion of the correlation function by polynomial interpolation for determining the code phase at which the correlation function peaks;

(c) determining a difference in area between a right section and a left section of the correlation function, the left section covering the area under the correlation function to the left of the correlation peak, and the right section covering the area under the correlation function to the right of the correlation peak;

(d) applying a proportionality constant to the difference in area of the right section and the left section of the correlation function to determine the multipath error in the pseudorandom noise signal; and (e) removing outliers of the correlation function and filtering one or more acceptable multipath errors over multiple code tracking loop invocation periods up to a measurements generation period to improve the accuracy of the estimated multipath.

4. The method of claim 1, wherein the step of determining the correlation values at non uniformly distributed points on a correlation function comprises programming the spacing between the correlators at the rate at which the code tracking loop is invoked thereby providing the flexibility for deriving the correlation values at different points on a correlator function at different times.

5. The method of claim 1, wherein the step of conducting a curve fitting comprises screening the correlation values to detect outliers and erroneous data, thereby enhancing the robustness of the tracking method in weak signal strength conditions and in the presence of interferences.

6. The method of claim 1, wherein the step of generating non-uniformly spaced correlators comprises the steps of:

(a) coupling a set of parallel numerically controlled correlators and corresponding pseudorandom noise sequence generators per satellite tracking channel;

(b) programming each numerically controlled oscillator for the entire set of numerically controlled oscillators per satellite tracking channel to trigger the corresponding pseudorandom noise sequence generator at the common programmed frequency; and (c) programming each numerically controlled oscillator for the entire set of numerically controlled oscillators per satellite tracking channel to trigger the corresponding pseudorandom noise sequence generator with different phases, whereby the difference in phases of coarse acquisition code in each correlator in the channel gives rise to the different, programmable, non-uniform spacing between the correlators in the satellite tracking channel.

* * * * *